July 5, 1932.  N. A. CURTISS  1,866,250
METHOD OF FORMING CABLES
Original Filed Aug. 3, 1929   4 Sheets-Sheet 2
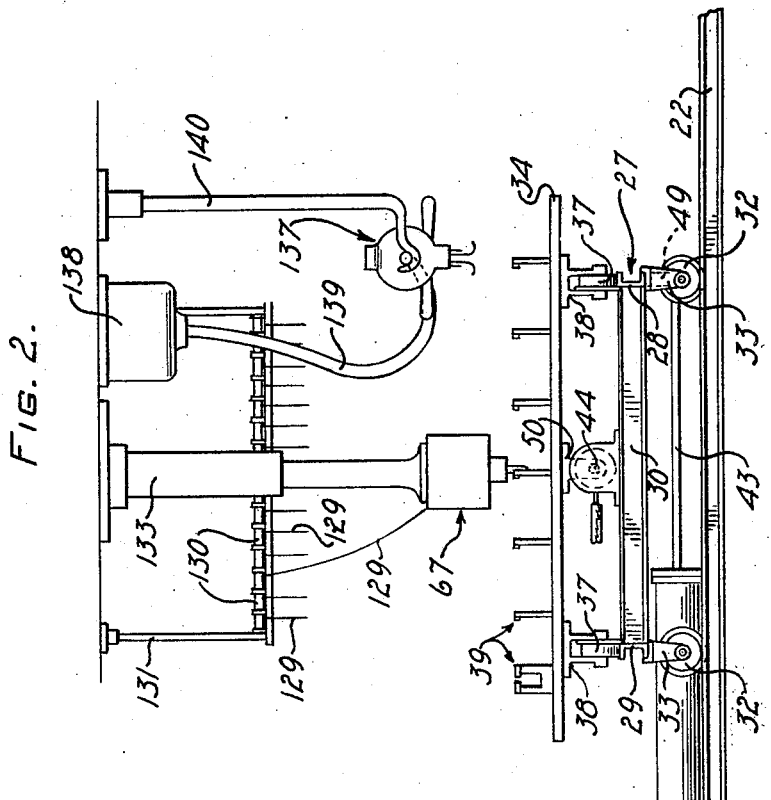
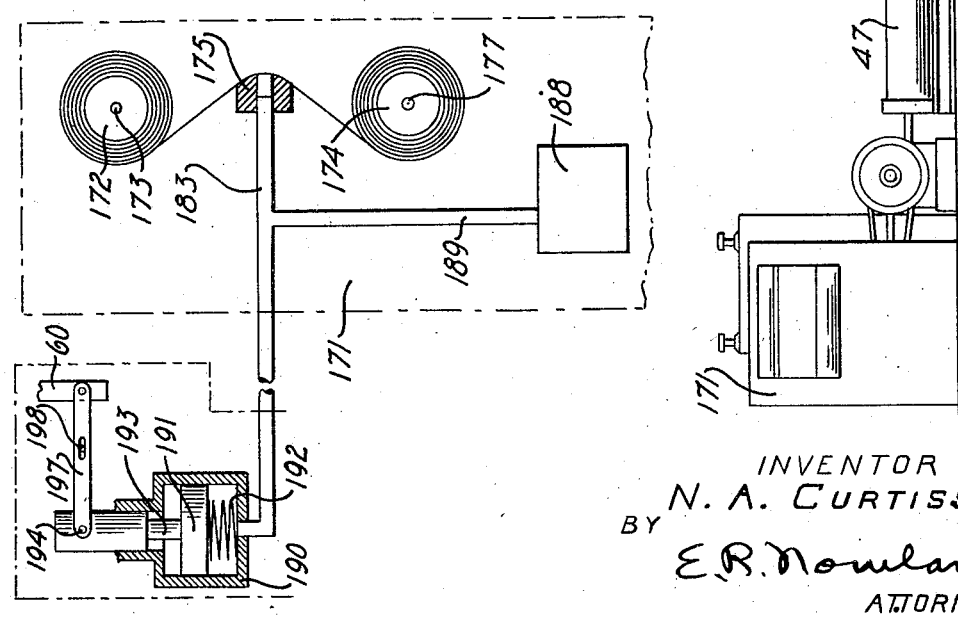
INVENTOR
N. A. CURTISS
BY
E. R. Nowlan
ATTORNEY July 5, 1932.  N. A. CURTISS  1,866,250
METHOD OF FORMING CABLES
Original Filed Aug. 3, 1929   4 Sheets-Sheet 3
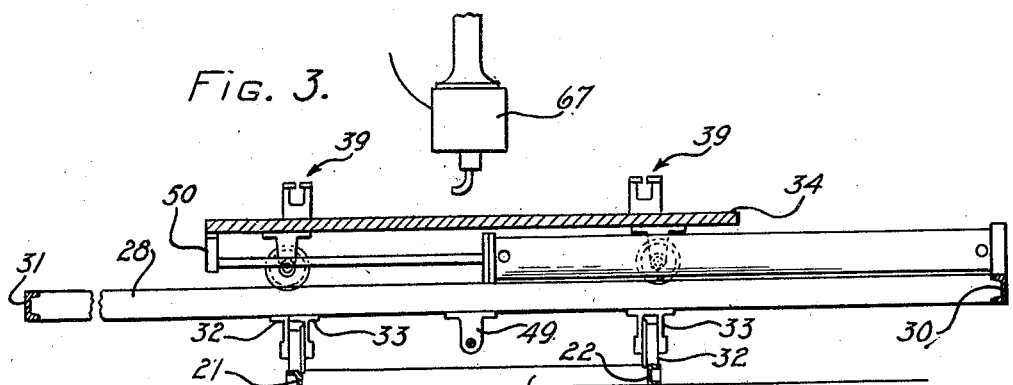
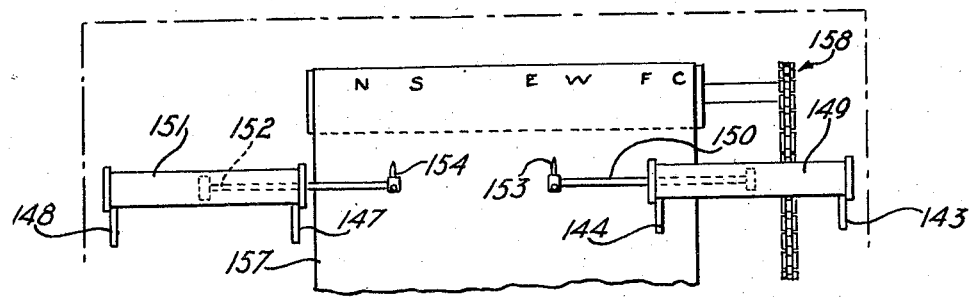
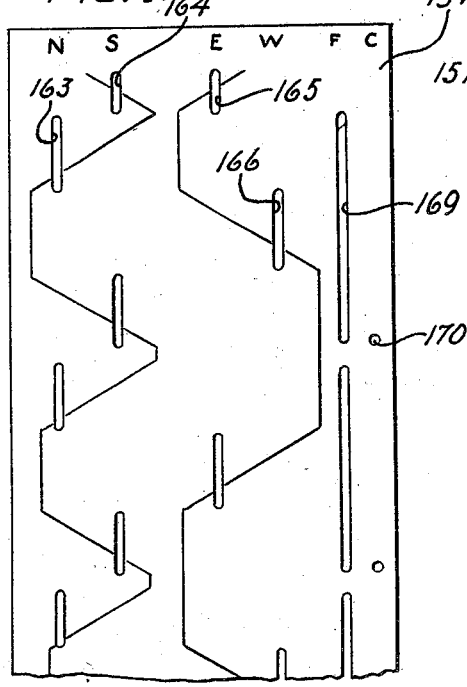
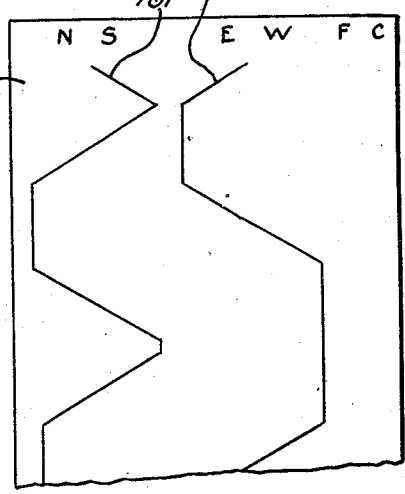
INVENTOR
N. A. CURTISS
BY
E. B. Nowlan
ATTORNEY July 5, 1932.  N. A. CURTISS  1,866,250
METHOD OF FORMING CABLES
Original Filed Aug. 3, 1929  4 Sheets-Sheet 4
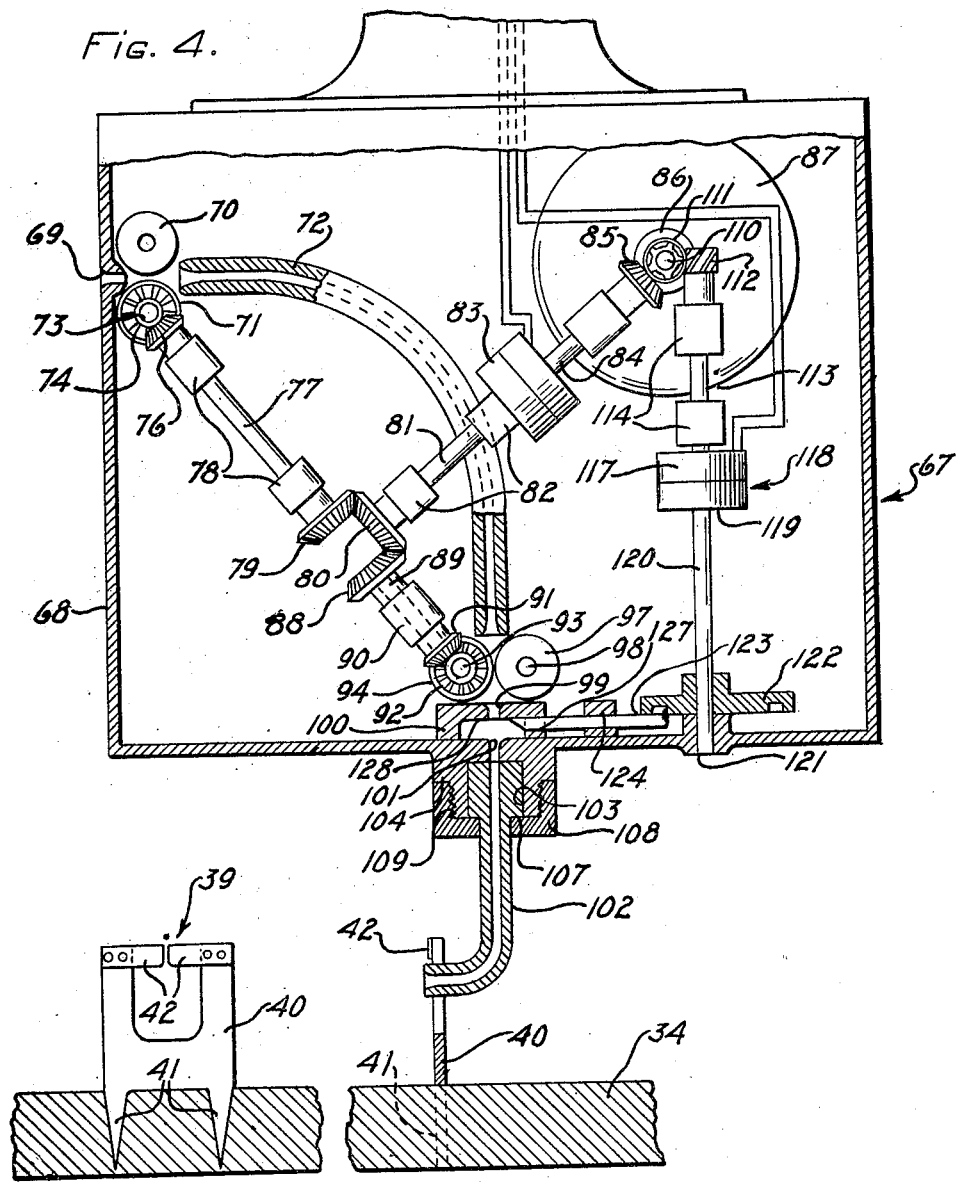
Fig. 4.
Fig. 5.
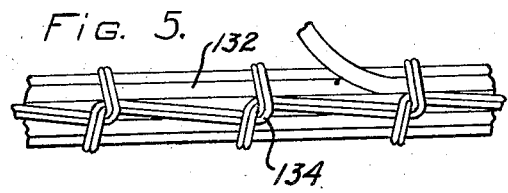
INVENTOR
N. A. CURTISS
BY
E. R. Nowlan
ATTORNEY Patented July 5, 1932

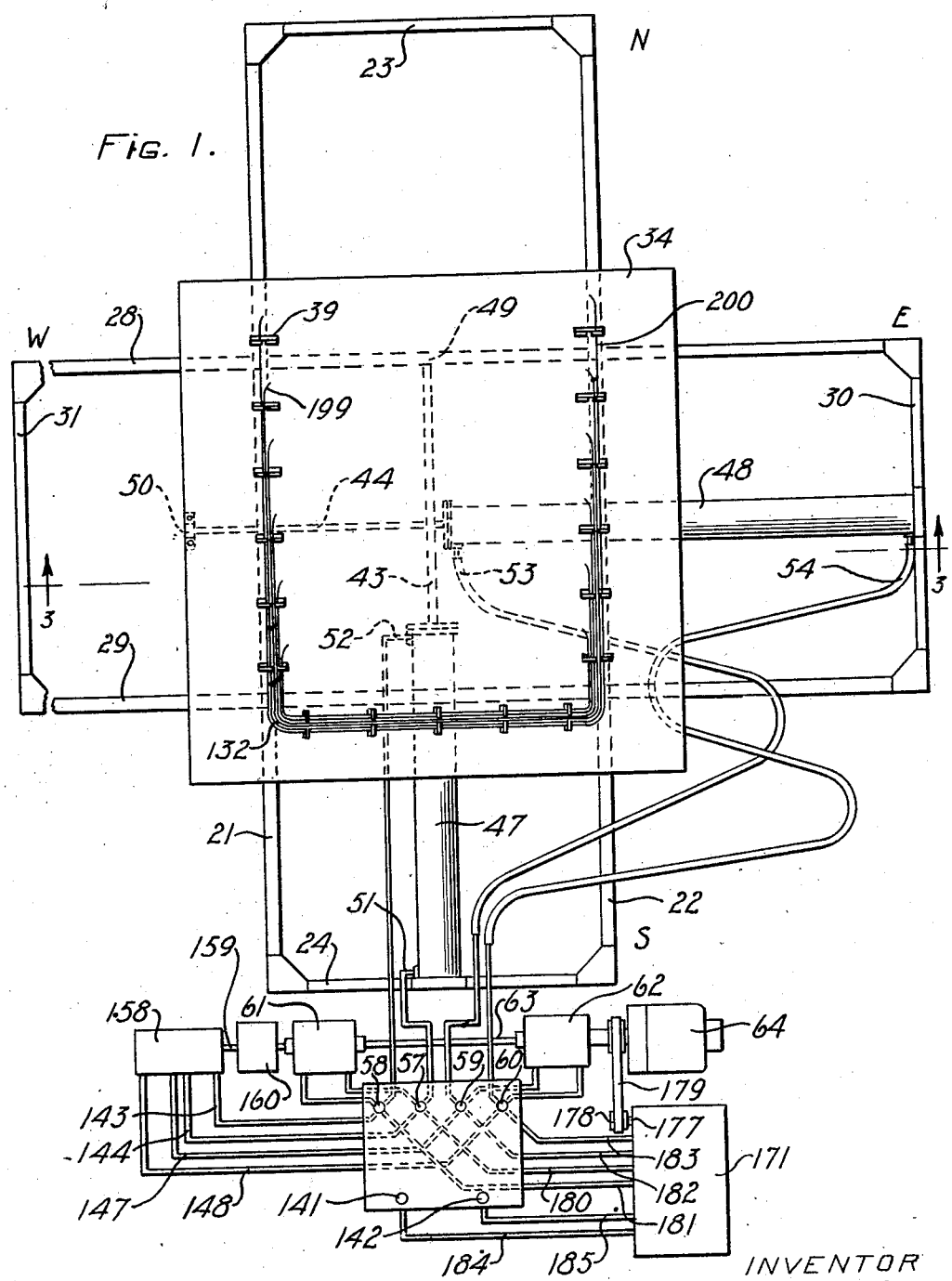

1,866,250

UNITED STATES PATENT OFFICE

NATHAN A. CURTISS, OF RIDGEWOOD, NEW JERSEY, ASSIGNOR TO WESTERN ELECTRIC COMPANY, INCORPORATED, OF NEW YORK, N. Y., A CORPORATION OF NEW YORK

METHOD OF FORMING CABLES

Original application filed August 3, 1929, Serial No. 383,386. Patent No. 1,823,680, dated September 15, 1931. Divided and this application filed December 24, 1930. Serial No. 504,503.

This invention relates to a method of forming materials, and more particularly to a method of forming and sewing strands to form a cable, and is a division of my copending application, Serial No. 383,386, filed August 3rd, 1929.

In manufacturing electrical apparatus it is often necessary to interconnect various parts of the apparatus with conductors and for this purpose a number of strands of insulated conductors of various lengths are formed into a cable having leads therefrom leading to the various parts of the apparatus. In the telephone art where these cables simply connect various pieces of electrical apparatus within one unit of a telephone instrument, exchange switchboard or the like, they are sometimes called "local cables" since they are formed from wire rather than sheathed cable to meet the particular conditions of the apparatus and circuits of the unit.

Local cables in some cases have heretofore been formed manually in the following manner; a full sized chart or layout showing the exact contour of the desired cable is drawn on a table and nails are driven into the table at intervals, particularly at the points where the cable is to be curved or where a skinner is to extend from the cable for connection to a terminal of a piece of apparatus. The wire is then formed on the table about the nails. After all the wires have been laid, the cable is sewed manually with cord using a wrap around stitch. The same chart and series of nails may then be used to produce other similar cables.

An object of the present invention is to provide an improved method of forming cables.

In accordance with one embodiment, the invention contemplates a method which may be practiced by providing a table having wire receiving clips positioned thereon, selectively movable in a plurality of directions in one plane. A head adapted to feed wire is positioned above the table for feeding wire to the clips as the table is moved about thereunder and mechanism, including a plurality of oil gear pumps, is provided for moving the table about, under the wiring head, the movement of the table and the operation of the wiring head being controlled manually in the first instance. While a cable is being formed under manual control a record of the movements of the table under the wiring head is made by a recording device from which a record may be made of the feeding of the wire to the clips by the wiring head. After the cable has been formed under manual control, the record made by the recording device together with perforations for controlling the feeding of wire, the location of which may be determined from the record of movements of the table, are inscribed in a roll of paper in terms of the location of perforations in the paper. The roll is then placed in a pneumatic device of the type used in player pianos which will control the oil gear pumps in accordance with the information inscribed in the paper roll to move the table about under the wiring head automatically in the same directions as it was moved under manual control and to control the operation of the wiring head. After the wires have been laid in the clips they may be sewed together by a manually controlled sewing machine provided therefor.

Other novel features and advantages of the invention will become apparent from the following detailed description, reference being had to the accompanying drawings, wherein—

Fig. 1 is a plan view of apparatus by means of which the method of the invention may be practiced, the wiring head and sewing mechanism being omitted for the sake of clarifying the drawings;

Fig. 2 is a side elevational view of the apparatus shown in Fig. 1, but showing the wire feeding and sewing mechanisms;

Fig. 3 is a fragmentary vertical sectional view taken on the line 3—3 of Fig. 1 in the direction of the arrows;

Fig. 4 is a transverse vertical sectional view taken through the wire feeding mechanism;

Fig. 5 is a view showing one type of sewing stitch for holding the wires together to form the cable;

Fig. 6 is a diagrammatic sectional view of the pneumatic means for controlling the wire feeding mechanism and the table;

Fig. 7 is a diagrammatic view of the recording mechanism;

Fig. 8 is an elevational view of an example of the type of record made by the recording mechanism; and Fig. 9 is an elevational view of the same record after it has been perforated for use in the pneumatic control mechanism.

Referring now to the drawings wherein like reference characters designate the same parts through the several views, particular reference being had to Figs. 1, 2 and 3, the numerals 21 and 22 designate a pair of rails positioned upon the floor, connected by a pair of tie members 23 and 24, and adapted to support indirectly a carriage designated generally by the numeral 27 composed of a pair of rails 28 and 29 connected by tie members 30 and 31.

The carriage 27 is provided with flanged wheels 32 journalled in forked members 33 secured to the under side of the rails 28 and 29 and designed to ride upon the rails 21 and 22. In a like manner the carriage 27 indirectly supports a table 34 which is provided with wheels 37 journalled in forked members secured to the under side of the table 34 and which has a plurality of clips 39 positioned on the upper surface thereof in predetermined relation dependent upon the conformation of the cable which it is desired to produce.

The clip 39 (Fig. 4) is composed of a substantially U-shaped member 40 provided with downwardly extending prongs 41 adapted to be driven into the table 34. Each of the arms of the substantially U-shaped member 40 has a resilient member 42 secured thereto which normally serves to close the open end of the member 40.

The carriage 27 may be moved to the right or left (Fig. 2) and the table 34 may be moved to the right or left (Fig. 1) by piston rods 43 and 44, respectively. For the sake of simplifying the disclosure each of these four directions will be given definite names, for example; movement of the table toward the tie member 23 shall hereinafter be termed "movement to the north", movement toward the tie member 24 shall be termed "movement to the south", movement toward the tie member 30 shall be termed "movement to the east", and movement toward the tie member 31 shall be termed "movement to the west".

A pair of cylinders 47 and 48 cooperate with the piston rods 43 and 44, respectively, to actuate them for moving the table 34 in north and south, and east and west directions, respectively, the rod 43 being connected to the under side of the carriage 27 as shown at 49 and the rod 44 being connected to the under side of the table 34 as shown at 50. The cylinder 47 is secured to the tie member 24 and the cylinder 48 is mounted upon the tie member 30 in a similar manner so that upon fluid being admitted to the cylinders 47 and 48 the associated piston rods will move the table and carriage or the table alone in a north or south, or east or west direction, respectively, depending upon which end of the cylinder is supplied with fluid under pressure.

The cylinder 47 is supplied with fluid under pressure either through a pipe 51 or a pipe 52. It will be apparent that after fluid under pressure is admitted through the pipe 51, which is connected to the south end of the cylinder 47, the piston rod 49 will be moved in a northerly direction to move the carriage 27 and the table carried indirectly thereby in a northerly direction. It will also be apparent that if the fluid under pressure is permitted to flow out of the cylinder 47 through the pipe 51 and fluid under pressure is supplied through the pipe 52 connected to the north end of the cylinder 47 that the table and carriage will be moved in a southerly direction. In a like manner, the table 34 may be moved in either an easterly or westerly direction upon the carriage 27 by supplying fluid under pressure to either the west or east end of the cylinder 48, flexible hose connections 53 and 54 being provided therefor.

The pipes 51 and 52 and the flexible hose connections 53 and 54 are connected to valves 57, 58, 59 and 60, respectively, of any well known type which may be operated to permit a flow of fluid therethrough in one direction, upon actuation thereof and which when not in an actuated position will permit the fluid to flow therethrough in the opposite direction. For the purpose of illustration, it will be assumed that the fluid being used is oil and the means for maintaining the fluid under pressure are a pair of oil gear pumps 61 and 62 driven from a common shaft 63, which is driven by an electrical motor 64, connected to a source of electrical energy (not shown) by conductors (not shown).

The table may thus be moved about in any of four directions in one plane or if it is desired to so move it, it may be moved in a northeasterly, southeasterly, southwesterly, or northwesterly direction by selecting the proper combination of valves and operating them at the same time. It will thus be apparent that the table in moving about under manual control may be so guided as to trace the desired path under a wire feeding apparatus designated generally by the numeral 67.

The wiring head 67 (Fig. 4) comprises a housing 68 which is apertured at 69 to permit the insertion of a wire therein. Closely adjacent the aperture 69 there is rotatably positioned an idler roller 70, which cooperates with a driven roller 71 for drawing the strand of wire into a guide tube 72. The driven roller 71 is mounted on a stud shaft 73 journalled in the housing and has a bevel gear 74 keyed thereto which cooperates with a bevel gear 76 mounted on a shaft 77 which is journalled in bearings 78—78 secured to the inner wall of the housing 68. The shaft 77 carries a second bevel gear 79 which meshes with a gear 80 mounted on a shaft 81 journalled in bearings 82—82 mounted on the wall of the housing 68. An electromagnetic clutch 83 of any suitable type, which will be actuated in a manner to be described hereinafter, may be actuated to connect the shaft 81 to a constantly rotating shaft 84 driven through bevel gears 85 and 86 by an electrical motor 87. The gear 80 also drives a gear 88 mounted on a stud shaft 89 journalled in a bearing 90 which shaft carries at its other end a second bevel gear 91. The bevel gear 91 meshes with a bevel gear 92 mounted on a shaft 93, which drives a roller 94 of the same type as the roller 71. An idler roller 97, which is rotatable about a shaft 98 mounted in the side of the housing being provided for directing a strand which has been forced through the guide tube 72 to an aperture 99 formed in a cup shaped member 100, the construction of which will be described more in detail hereinafter.

In line with the aperture 99 is an aperture 101 formed in the side of the housing and being suitably beveled to receive the end of a strand of wire for directing it to a guide member 102 which is rotatably mounted in a depression 103 formed in a projecting portion 104 of the housing 68. The guide member 102 is provided with an annular shoulder 107 which is engaged by a retaining member 108 threaded on the projection 104 at 109 to hold the guide member 102 in place.

The motor 87, the shaft 110 of which supports and drives the gear 86, also drives a worm 111 mounted on the shaft 110 which meshes with a worm gear 112 mounted on a shaft 113. The shaft 113 is journalled in bearings 114—114 and drives the driven member 117 of a clutch designated generally by the numeral 118. The clutch 118, which may be of any suitable type which is operable upon being energized, to connect the driving member 117 to a driven member 119 for one revolution of the shaft 113 and then automatically disengage the driving and driven members. Connected to the driven member 119 of the clutch 118 is a shaft 120 journalled at 121 in the lower wall of the housing 68. A cam 122 is mounted upon the shaft 120 and upon rotation imparts a reciprocatory motion to a knife 123 slidably mounted in a member 124 secured to the housing 68. The knife is also slidable in an aperture 127 formed in the cup shaped member 100 and cooperates with an inner surface 128 of the cup shaped member to form a shearing mechanism which is operable upon reciprocation of the knife 123 to sever a strand of wire which has been threaded through the wiring head 67.

The strand of wire as indicated by the lines 129—129 is drawn from one of a number of spools 130—130 mounted upon a suitable rack 131 fixed to the ceiling and may be inserted in the wiring head 67 manually. The spools 130—130 are mounted upon the rack 131 and carry supplies of wire of various colors for use in making up a cable 132. The wiring head 67 which is mounted upon an extensible member 133 secured to the ceiling in any suitable manner may be moved down into operative association with the table 34 or may be moved up away from the table 34 to permit an operator to sew the strands into a unitary cable of the type shown fragmentarily in Fig. 5.

A sewing machine of any well known type which will sew a wrap around stitch such as that shown at 134 (Fig. 5) and designated generally by the numeral 137 is provided for sewing the strands into a unitary cable. The sewing machine 137 is connected to a driving mechanism of any suitable type 138 by a flexible shaft 139 of sufficient length to permit an operator to move the sewing machine to any corner of the table 34 to sew the strands into a unitary cable. A hooked supporting member 140 secured to the ceiling is provided for supporting the sewing machine when not in use.

It will be apparent from the foregoing description that manual operation of the valves 57, 58, 59 and 60 will control the movements of the table under the wiring head and the clutches 83 and 118 may be controlled by the keys 141 and 142, respectively. Thus it will be obvious that if it is desired to lay a strand of wire from the northwest corner to the southwest corner of the table, a wire may be inserted at 69 in the wiring head and fed along the west side of the table (see Fig. 1), and clips having been provided in the table, it will be maintained within the clips, provided the proper valve of the valves 57, 58, 59 and 60 have been operated and also provided the key 141 has been operated to cause the wire feeding mechanism in the wiring head to draw the wire therethrough. After the wire has thus been laid on the table the key 142 may be operated to sever the wire from the supply.

The valves 57, 58, 59 and 60 upon being operated manually also open suitable valves of any well known type to cause oil to flow from the pumps 61 and 63 through either of the pipes 143, 144, 147 or 148 depending upon which of the valves has been operated. The pipes 143 and 144 supply fluid to the right and left end (Fig. 7) of a cylinder 149 to move a piston 150 associated therewith either to the right or the left depending upon the direction of flow through the pipes 143 and 144. In a like manner the pipes 147 and 148 are connected to the right and left ends (Fig. 7) of a cylinder 151 in which a piston 152 is reciprocable. The pistons 150 and 152 carry at their extreme left and right ends, respectively suitable marking instruments 153 and 154 which bear upon a strip of paper 157 which is moved transversely of the direction of movement of the pistons 150 and 152.

The cylinders 149 and 151 and their cooperating parts, together with the paper and means for driving the paper, are mounted within a cabinet 158 and have been described herein as a convenient type of mechanism which may be used for this purpose. The paper 157 is caused to move past the recording instruments 153 and 154 by a sprocket chain mechanism 158 driven from a shaft 159 connected to the main driving shaft 63 through a suitable speed reducer 160.

By moving the table in a predetermined direction under the wiring head through manual control of the valves 57, 58, 59 and 60, the recording instrument being driven in synchronism with the speed of movement of the table, a record of the movements may be made upon the sheet 157 by the recording mechanism described hereinbefore. An example of the type of record made by the recording mechanism is shown in Fig. 8, a line 161 representing the movements of the table in a north and south direction and a line 162 representing the movements of the table in an east and west direction.

After a record of the type shown in Fig. 8 has been made by the recording mechanism, the sheet may be perforated with perforations 163 representing the movement in a northerly direction, perforations 164 representing movement of the table in a southerly direction, and perforations 165 and 166 representing the movements of the table in an east and west direction, respectively. From this a record for feeding and clipping the wire may be readily compiled and perforations 169 may be formed in the sheet indicating the length of time that the wire is being fed, and perforations 170 indicating the time at which the key 142 is operated to sever the strand of wire from the supply.

After a record of the type shown in Fig. 9 has been made the roll of paper having perforations therein may be inserted in an automatic control mechanism 171, the structure of which is shown schematically in Fig. 6. A drum 172 rotatable about a shaft 173 is provided for receiving the roll of paper which may be directed past an apertured member 175 and secured to a drum 174 rotatable with a shaft 177 on which is mounted a pulley 178 driven from the motor 64 by a belt 179. The sheet 157 will thus be drawn from the drum 172 to the drum 174 and will move past the member 175. Suitable apertures are provided in the member 175 for registering with the apertures 163, 164, 165, 166, 169 and 170 and communicate with pipes 180, 181, 182, 183, 184 and 185, respectively.

A suitable exhaust pump 188 is connected through separate pipes 189—189 to the pipes 180, 181, 182, 183, 184 and 185, which are in turn connected to separate cylinders 190—190. To simplify the disclosure only the pipe 183 which controls the valve 60 will be shown, but since each of the pipes 180 to 185 control either one of the valves 57 to 60, inclusive, or the control keys 141 or 142, it will be understood that the mechanism for operating each one of these valves or control keys automatically, is the same as that shown for operating the valve 60.

The pipe 183 enters the lower end of the cylinder 190 and unless there is a perforation in the sheet opposite the aperture associated with the pipe 183 the pump 188 will set up sufficient suction to draw a piston 191 positioned in the cylinder 190 downwardly against the action of a compression spring 192. However, when an aperture in the sheet is opposite the aperture connected with the pipe 183, the action of the pump 188 will be nullified since air may be drawn through the aperture in the sheet and the member 175, thus permitting the piston 191 to move upwardly. A piston rod 193 is mounted on the end of the piston 191 and has pivoted thereto at 194 a lever 197 which rocks about a pivot pin 198. The other end of the lever 197 is pivoted to the lower end of the valve 60 and upon movement of the piston 191 upwardly the valve 60 will be actuated.

It is believed that a clear understanding of the method of this invention will be had by reference to the following description of the operation of the above described apparatus. Let it be assumed that it is desired to form a local cable of the type shown on the table 34 in Fig. 1, consisting of a substantially U-shaped arm having skinners 199 leading therefrom at predetermined intervals. It will be necessary to locate a number of clips 39 at predetermined intervals upon the table 34 whereupon an operator may, by controlling the valves 57, 58, 59 and 60, and the control keys 141 and 142, move the table about under the wiring head 67 and feed wire therethrough to the clips 39. The guide member 102 of the wiring head passes through the U-shaped opening of the clips 39 as shown in Fig. 4 and deposits strands of wire in the clips. The operator in order to lay such a cable, assuming that the table 34 is centered directly under the wiring head, will first actuate the keys 58 and 59 simultaneously to move the table in a southeasterly direction and bring the northwest corner of the table directly under the wiring head. A wire may be inserted in the wiring head 67 and the table moved in a northerly direction by actuating the valve 57. After the table has moved in a northerly direction the required amount, valve 57 may be released and valve 60 actuated to move the table in a westerly direction a predetermined amount whereupon the key 58 may be actuated to move the table in a southerly direction. After a sufficient interval of time has elapsed to permit the table to travel the required amount the key 141 may be released and the key 142 actuated momentarily, thus stopping the feeding of wire and severing the strand which has been laid on the table from the supply. The sequence of operations hereinbefore described, it will be apparent, would deposit a strand on the table in the position indicated by a line 200 and similar operations would lay the remaining strands to form the cable 132.

While the cables are being formed under manual control as heretofore described a record such as that shown in Fig. 8 will be made by the recording device. The record as shown in Fig. 8 may then be perforated as shown in Fig. 9 and the perforated roll inserted in the automatic control mechanism 171. It will be apparent that by running the record thus made through the automatic control mechanism, the table may be moved under the wiring head in the same directions as it was moved under manual control and a cable laid automatically.

Although a specific embodiment of this invention has been described hereinbefore, it is to be understood that the invention is not limited to this specific embodiment, but should be limited only by the scope of the appended claims.

What is claimed is:

1. The method of forming cables which consists in supplying strands from a fixed point to a form, moving the form relative to the fixed point to apply strands thereto, and securing the applied strands into a unitary cable.

2. The method of forming a cable which consists in moving a support in a plurality of directions in a plane, feeding strands to the moving support, and binding the strands together to form a unitary cable.

3. The method of forming cables, which comprises causing a relative movement between a strand and a support to apply the strand to the support to produce a cable, and simultaneously therewith making a record of such movement.

4. The method of forming cables, which comprises causing a relative movement between a supply of strands and a support to apply strands to the support in the form of a cable of the desired configuration, making a record of the movement, and reproducing the movement from the record to produce similar cables.

5. The method of forming cables, which comprises causing a relative movement between a supply of strands and a support to apply the strands to the support in the form of a cable of a predetermined configuration, simultaneously therewith making a record of such movement, and transforming the record to a control member for reproducing the movement to produce similar cables.

In witness whereof, I hereunto subscribe my name this 12th day of December A. D., 1930.

NATHAN A. CURTISS.